United States Patent [19]

Shore et al.

[11] 4,015,681
[45] Apr. 5, 1977

[54] GROUND DRIVEN HYDRAULIC EMERGENCY STEERING SYSTEM

[75] Inventors: Daniel B. Shore, Niles; Edward D. Duke, Chicago, both of Ill.

[73] Assignee: International Harvester Company, Chicago, Ill.

[22] Filed: Nov. 6, 1975

[21] Appl. No.: 629,441

[52] U.S. Cl. .................................. 180/133; 60/405
[51] Int. Cl.² .......................................... B62D 5/06
[58] Field of Search ..................... 180/133; 60/405

[56] References Cited

UNITED STATES PATENTS

| | | | |
|---|---|---|---|
| 2,954,671 | 10/1960 | Kress | 60/405 |
| 3,279,558 | 10/1966 | Allen | 180/133 |
| 3,424,262 | 1/1969 | Kunz | 180/133 |
| 3,528,522 | 9/1970 | Turke | 60/405 X |
| 3,631,937 | 1/1972 | Joyce | 180/133 |
| 3,696,613 | 10/1972 | Goodale | 180/133 X |
| 3,896,618 | 7/1975 | Smith | 60/405 |

Primary Examiner—Robert R. Song
Assistant Examiner—R. Schrecengost
Attorney, Agent, or Firm—Douglas W. Rudy; Floyd B. Harman

[57] ABSTRACT

Hydraulically operated steering systems normally supplied with fluid from an engine driven pump rely on an auxiliary pump upon failure of the primary pump. A ground driven pump incorporating a pressure sensing device automatically provides fluid to the power steering system in the event of an engine or primary pump failure.

4 Claims, 5 Drawing Figures

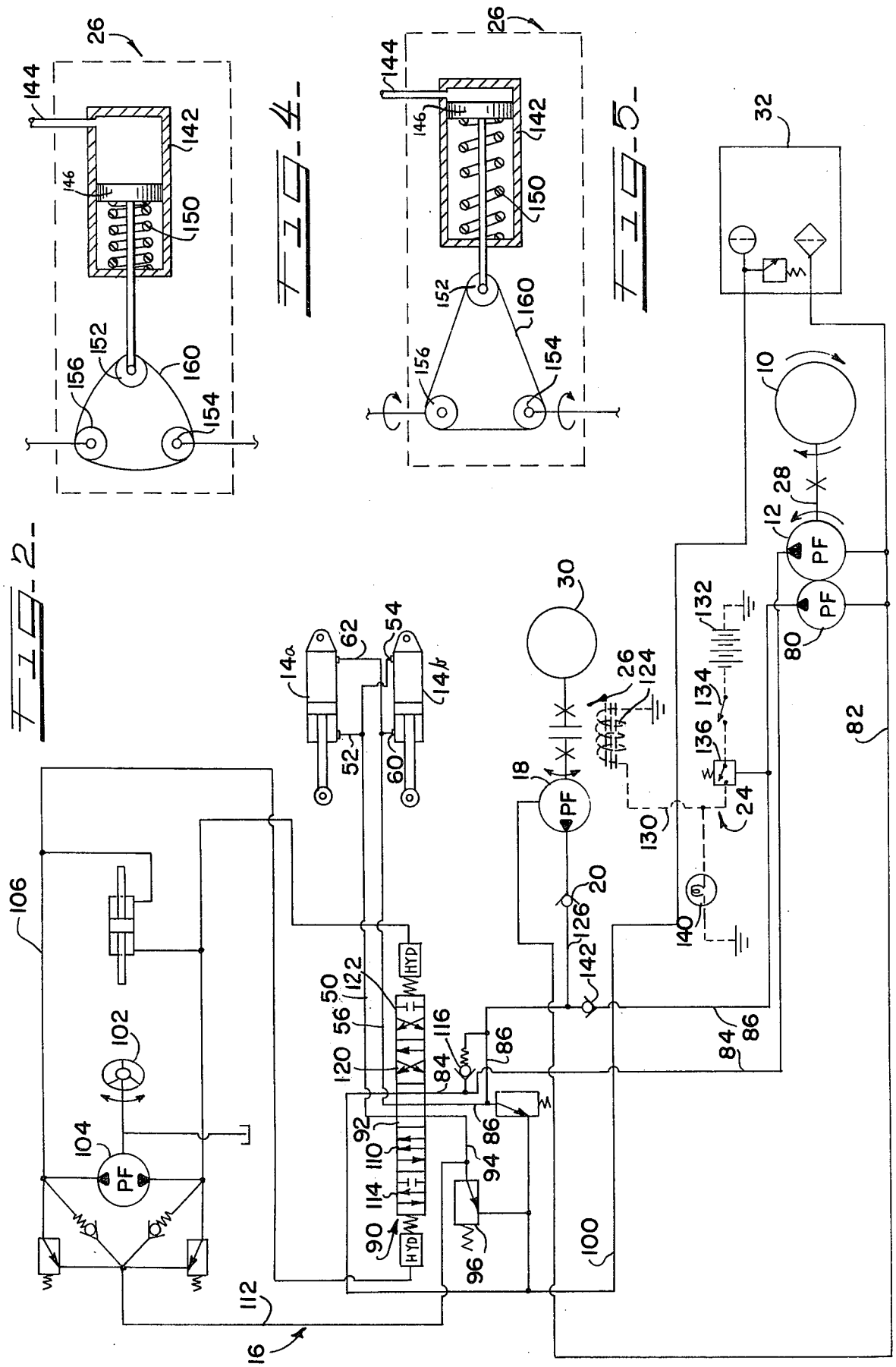

GROUND DRIVEN HYDRAULIC EMERGENCY STEERING SYSTEM

BACKGROUND OF THE INVENTION

1. Field of the Invention

The invention disclosed herein is concerned with the emergency steering systems of hydraulically steered vehicles. Particularly emphasized is the method of initiating the emergency steering function.

2. The Description of the Prior Art

The usual method for steering large construction vehicles is through the use of hydraulic steering. Vehicles such as articulated tractors, articulated loaders, road graders and off the road trucks are included in this group of large vehicles.

In hydraulic steering systems on this type of equipment the vehicle engine is usually geared to drive a positive displacement, either fixed or variable, hydraulic pump which supplies fluid to the steering cylinders. An open center valve arrangement may be incorporated in the system to direct fluid to the appropriate steering cylinder or back to a fluid reservoir when fluid flow to the steering cylinders is not needed.

In an emergency situation, such as an engine failure or the steering system hydraulic pump failure, a vehicle having a hydraulic steering system would loose steering control as the flow of fluid to the steering cylinders is paramount to the operation of the system.

Various solutions have been proposed to provide fluid flow to the steering systems when a system component fails. Typically either an accumulator is used to store fluid under pressure for use as necessary or a ground drive auxiliary pump is incorporated into the steering system. Also, auxiliary power sources such as electric motors have been provided to drive hydraulic pumps.

An accumulator proves to be deficient as it can only supply a limited amount of fluid for a limited time. Thus emergency steering will be inoperative upon exhaustion of the fluid from the accumulator. The electrically driven pump has the advantage of being available at all times to supply fluid flow to the steering system. However, it is desirable to have this pump operating only during times of need.

An emergency steering system incorporating a ground drive pump is the most effectual of present systems. A ground drive pump incorporating the innovations of the present invention will be very efficient in operation.

A significant innovation of the present invention is the sensing system which allows the engagement of the ground drive pump upon loss of fluid pressure from the primary system.

SUMMARY OF THE INVENTION

The invention presents an automatically engageable auxiliary source of hydraulic power to supply fluid to a vehicle hydraulic steering system in the event of a failure of the primary power source.

A ground driven hydraulic pump driven through a component of the vehicle which is in motion when the vehicle is in motion, is provided. This pump is driven upon failure of the primary power source, the primary pump, or upon sensing a drop in fluid pressure.

The primary pump, driven by the vehicle engine, draws hydraulic fluid from a reservoir and delivers it through a check valve to the vehicle steering valve and associated steering cylinders as necessary. Exhaust oil is returned to the reservoir.

A clutching means, incorporating a magnetic clutch operatively associated with pressure sensing electrical switch, is provided. The pressure sensing switch is responsive to pressure in the primary hydraulic system where fluid pressure acting on the pressure sensing switch may be sensed.

During normal operation the fluid pressure in the primary hydraulic system as generated by the primary hydraulic pump would be of a value to ensure that the pressure sensing electrical switch remains open and consequently, the magnetic clutch is not engaged allowing the ground driven pump to commence delivery. Upon loss of fluid pressure in a primary hydraulic system the pressure sensing electrical switch will allow engagement of the magnetic clutch thus allowing the emergency pump to be driven by a ground driven source. The emergency pump will draw fluid from the reservoir and deliver the fluid to the primary steering system.

One object of this invention is to provide fluid pressure to a hydraulic steering system when either the vehicle engine or the primary hydraulic steering pump has failed.

An object of the present invention is to provide a ground driven pump that is automatically engaged upon loss of fluid pressure in a hydraulic steering system.

A further object of this invention is to provide a ground driven pump that is automatically disengaged when it is not needed in order to prevent a full time horsepower drain on the prime mover.

Another object of the invention is to provide steering when a vehicle is being towed, pushed, or otherwise moved with the engine not running.

BRIEF DESCRIPTION OF THE DRAWINGS

The aforementioned objects and advantages, as well as others disclosed in this specification, will be evident when explained in the following descriptions when taken in conjunction with the drawings in which:

FIG. 2 presents a detailed schematic of the preferred embodiment of the steering system of the invention;

FIG. 4 shows the alternative clutch means schematically depected in FIG. 3 in a disengaged mode; and FIG. 5 shows the alternative clutch means of FIG. 4 in an engaged mode.

DETAILED DESCRIPTION OF THE INVENTION

Figure 1:
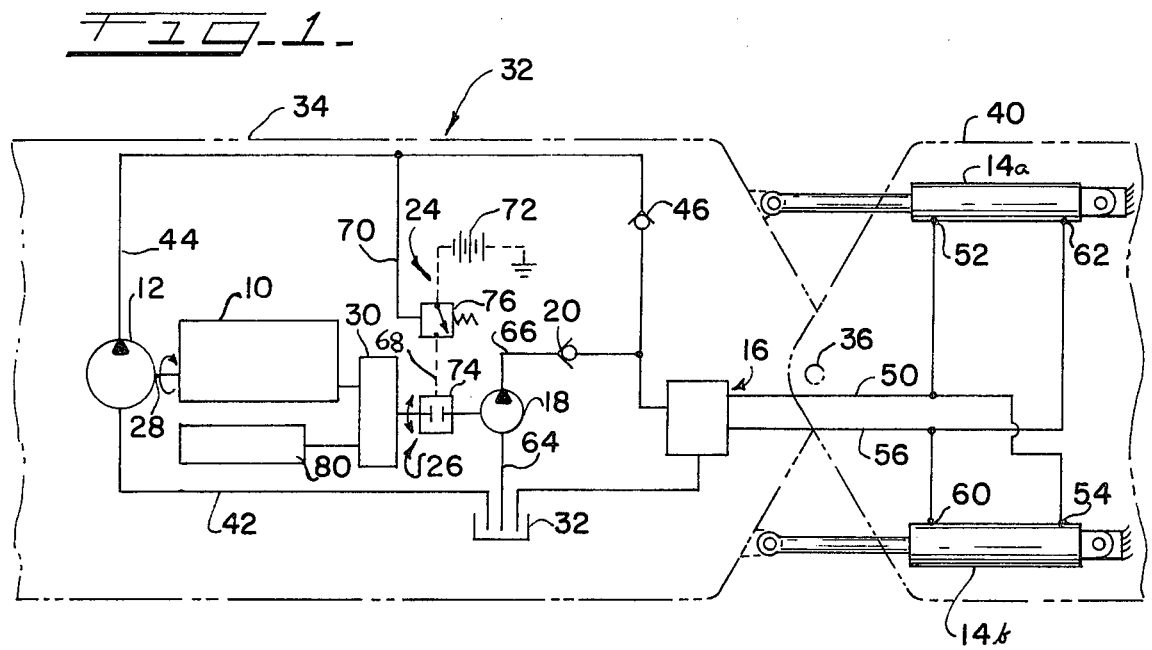
FIG. 1 presents a schematic representation of the primary and emergency steering systems of the invention projected on a representative portion of an articulated vehicle.
Figure 3:
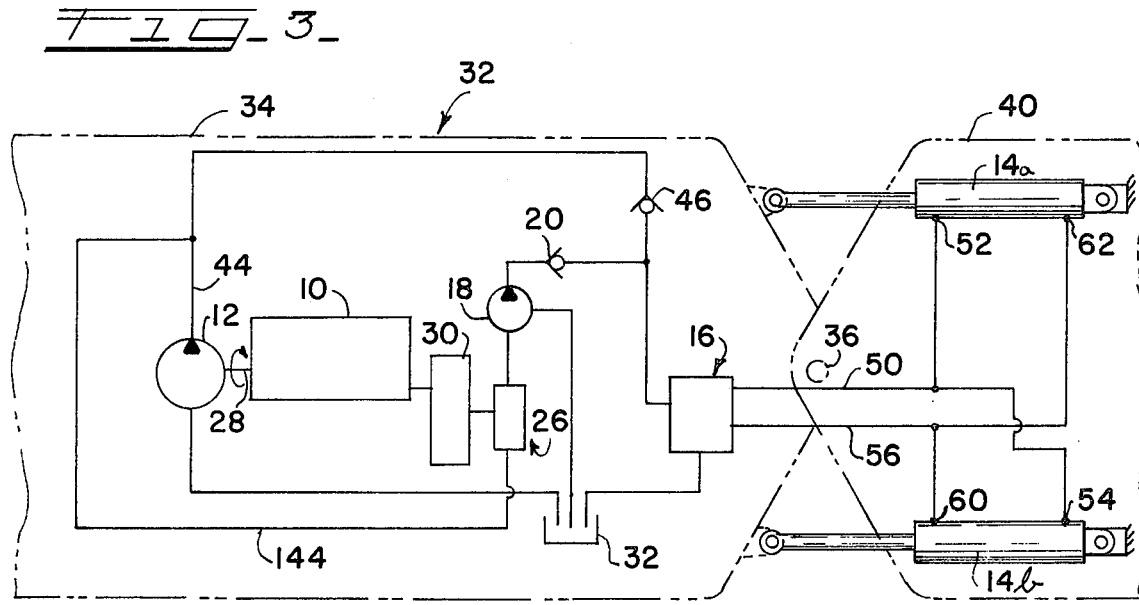
FIG. 3 presents an alternative clutch means for use with the emergency steering system.

Looking first at FIGS. 1, 2, and 3 the common elements in each figure include a prime mover or vehicle engine 10 connected to drive a primary fluid pump 12 which supplies fluid to each of a pair of steering cylinders 14a, mounted on the left side of the vehicle and 14b, mounted on the right side of the vehicle. Note that the vehicle shown in the figures is normally operated in the manner where the engine means 10 follows the cylinders 14a and b when the vehicle is moving forward. The operator sits facing the normal forward direction and his left corresponds to the left side of the vehicle.

Fluid delivery is directed to each individual cylinder through the selective valving means shown generally as 16. Appropriate fluid lines will be discussed with each of the individual drawings.

Common to the first three figures is the emergency fluid pump 18 which may deliver fluid past the one-way check valve 20 through a fluid line to the primary fluid delivery system. Emergency fluid pump 18 is activated upon a signal from a sensing means generally 24 (not specified in FIG. 3) which initiates engagement of a clutch means, generally 26, which allows the ground drive source 30 to drive the emergency pump 18 whenever the vehicle is moving and the supply of fluid from the primary fluid pump 12 has been reduced.

Fluid for use by the primary fluid pump 12 or the emergency fluid pump 18 may be drawn from the reservoir source of fluid 32 or from different reservoirs as deemed necessary.

FIG. 1 presents the basic emergency steering system of this invention. This simplified layout of the hydraulic fluid system is schematically presented as operative in an articulated vehicle generally 32, having a drive means housing portion 34 pivotally connected at point 36 to a forward portion 40 which would normally be of a leading portion of the vehicle when the vehicle is traveling forward.

The operation of the simplified steering system shown in FIG. 1 depends on adequate fluid flow to the steering cylinders 14a and 14b. The vehicle engine 10 drives the primary fluid pump 12 through shaft 28 (common to FIGS. 1, 2 and 3) which obtains fluid from the reservoir 32 by means of conduit 42 and delivers fluid by means of conduit 44 to the selective valving means 16. A one-way check valve 46 allows fluid to flow only from the primary fluid pump 12 and not to the primary pump 12. The selective valving means 16 may include all the steering valving needed to direct fluid from the pump 12 to the approporiate steering cylinders including such items as a steering wheel, a small displacement hand pump, relief valves of various types, fluid direction control valves in control circuits. An embodiment of the selective valving means 16 will be further detailed in the explanation of FIG. 2.

The fluid is directed to the appropriate chambers of the double acting steering cylinders through the means provided by the selective valving means 16, conduit 50 which is split to provide fluid to the rear chamber (orifice 52) of the left steering cylinder 14a and to the front chamber (orifice 54) of the right steering cylinder 14b, and conduit 56 which is also split to provide fluid passage to the rear chamber (orifice 60) of the right steering cylinder 14b and to the front chamber (orifice 62) of the left steering cylinder 14a. The operation of the double acting steering cylinders is conventional.

Emergency steering system in the basic embodiment of FIG. 1 includes an emergency fluid pump 18 which may be supplied with fluid from reservoir source of fluid 32 by the conduit 64 and provides fluid to conduit 44 through conduit 66 past check valve 20.

A pressure sensing means generally 24 is electrically communicative through conduit 68 with a clutch means, generally 26. The pressure sensing means also includes a pressure supply line 70 which can communicate the pressure in conduit 44 to a spring loaded sensing valve. A source of electrical energy such as the battery 72 supplies current to the sensing switch as well as to the magnetic clutch 74.

In operation of the FIG. 1 embodiment a pressure sensitive electrical switch 76 between the battery 72 and the magnetic clutch is held open (i.e. electricity cannot pass from the battery to the magnetic clutch) by pressure in the pressure supply line 70 as a result of pressure in conduit 44 which indicates that the primary fluid pump is operative. If the pump 12 ceases to pump due to engine or pump failure, etc. sufficient fluid at a preset pressure (set at the pressure switch 76), the pressure seen by the pressure supply line 70 is decreased. The pressure sensitive switch will then close allowing electrical current to pass from the battery 72 to the conventionally operating magnetic clutch 74 which then engages the emergency pump 18 to a ground drive source 30. In the FIG. 1 sketch the ground drive source 30 is a transmission which is always turning as long as the final drive 80 is in motion. The final drive 80 is always in motion when the vehicle is in motion. If the vehicle continues in motion without fluid output from the primary pump 12 the final drive 80 will drive the ground drive source 30 which in turn will drive the emergency pump 18. The emergency pump 18 will draw hydraulic fluid from a reservoir, either the main or an auxiliary, and deliver this fluid to the fluid conduit 44 which leads, eventually, to the steering cylinders 14a and b. Check valve 46 ensures fluid flow to the selective valving means 16 rather than back to the primary pump 12.

Clarity of the diagram necessitated the conduit and mechanism layout shown in FIG. 1. It should be noted that the pickup point or tee between the conduit 44 and the pressure supply line 70 would be as close to the selective valving means 16 as possible as would check valve 46 and the connection or tee between conduit 66 and 44. This would minimize the loss of fluid pumped by the emergency pump 18 in case of a rupture of conduit 44.

A more complicated steering system is presented in FIG. 2 where the steering system of an articulated vehicle is presented. Although this system is similar to the embodiment of the system shown in FIG. 1 it is a more reasonable disclosure of what would be found in a vehicle needing an emergency steering system of this type.

The embodiment shown in FIG. 2 relies on two fixed displacement pumps of different capacities to supply fluid to a steering valve at either a low volume or a high volume in order to turn the vehicle either at a slow rate or at a fast rate.

The operation of vehicle steering requires that the prime mover or engine 10 drive the primary fluid pump 12 in tandem with the secondary fluid pump 80. These pumps draw fluid from the filter equipped reservoir 32 by means of fluid conduit 82.

The fluid is continuously pumped to the open center steering valve 90 via fluid conduits 84 (from 12) and 86 which directs fluid as required to steering cylinders 14a and b through conduits 50 and 56. When the steering valve 90 is in the center position as shown, fluid pressure in all the chambers (orifices thereof being 52, 62, 60 and 54) will be equal as the output of the secondary pump 80 will be split at the neutral gate 92 and will be directed to the reservoir 32 through conduit 94 past pressure relief valve 96 which will be opened allowing fluid flow to the return line 100. The output of the primary pump 12 circulates through the neutral gate 92 of the sleeve valve 90 to the reservoir 32 through fluid conduit 84 and return line 100 as its output is not needed.

Furthermore the output of the primary pump 12 is used only in situations requiring fast steering which is often in an articulated loader, for instance. Fast steering operation will be explained presently.

Firstly, it may be beneficial to consider the operation of the steering system in slow steering demands. When the vehicle operator turns a steering wheel 102 to the right a small steering pump 104 capable of delivering a small volume of fluid supplies fluid through conduit 106 to shift the steering valve 90 one gate to the right in a conventional manner. With the steering valve 90 positioned such that fluid from the fluid conduits 84 and 86 may pass through gate 110 and a right turn will be executed. Fluid from the secondary pump 80 passes through the gate 110, through conduit 56 into the chambers adjacent to the orifices 62 in 14a and 60 in 14b. As there is pressure increase in these chambers fluid will be forced out the chambers adjacent to the orifices 52 and 54. This displaced fluid will pass through conduit 50, through the gate 110, through conduit 94 pass low pressure relief valve 96, through return line 100 to the reservoir 32. A portion of the fluid from line 94 will pass through 112 to the steering pump system. The pressurization of the front chamber (62) of the left steering cylinder 14a and the rear chamber (60) of the right steering cylinder 14b results in a slow right turn of the vehicle.

In a fast steering situation the output of the primary pump 12 will be delivered to the steering cylinders 14. For fast steering the hand pump 104 allows increased fluid flow to the steering valve 90 such that the fast right gate 114 of the steering valve controls the fluid flow. Fluid from pump 12 passes through conduit 84 to the fast right gate 114 which is blocked by design so fluid then opens the one-way check valve 116 so that fluid passes into line 86 thus joining the output of the secondary pump 80 to pass through the fast right valve gate 114 to the steering cylinders. Just as in the slow steering example the chambers adjacent to the ports 62 and 60 will be pressurized forcing fluid out of the chambers adjacent to ports 52 and 54 which will then go to the reservoir as long as the relief valve 96 remains open. (When the relief valve closes fluid will flow to the steering pump system through conduit 112.) The fast steering circuit provides a considerable amount of fluid to the steering cylinders.

The function of both slow and fast turns to the left are similar in principle to the operation of the system as described for turns to the right. The slow left gate of the steering valve 90 is shown as 120 while the fast gate for left turns is shown at 122.

The emergency steering system of FIG. 2 includes an emergency fluid pump 18 which may be driven by a ground drive source 30 through the engagement of a clutch means, generally 26, which in this case is an electromagnetic clutch 124. The emergency fluid pump is supplied with fluid from the reservoir 32 through the means of fluid conduit 82. The pump resupplies fluid to the steering system by conduit 126 which incorporates a one-way check valve 20 allowing fluid to flow from the pump but not to the pump by a conduit 126. The electromagnetic clutch 124 is incorporated in an electrical circuit 130 which includes a battery source of energy 132, a master switch 134, and a pressure sensitive switch 136 which senses pressure in conduit 86 and when the pressure drops below a preset value the switch passes electrical energy. A warning light 140, operative upon completion of the circuit by the pressure sensitive switch 136, may be mounted in the vehicle to inform the vehicle operator that the emergency pump has been engaged.

The operation of the emergency steering system is relatively simple. An example of the performance of this system would originate with the failure of the prime mover or vehicle engine 10. When this unit stops, the driven pumps, both primary 12 and secondary 80, will cease to provide fluid to the steering valve. As there will be no fluid flow there will not, obviously, be any steering capability on the vehicle. When the pump ceases pumping the fluid in line 86 will bleed back through the pump allowing a pressure drop in fluid conduit 86. This pressure will rapidly fall below the threshold pressure of the pressure sensitive switch 136 thus allowing this switch to be closed. Assuming that the master switch 134, which may be tied into the ignition system of the vehicle, has been closed. The current will flow from the battery 132 to the electromagnetic clutch which will engage the clutch between the ground driven source 30 and the emergency fluid pump 18.

The ground driven source in this preferred embodiment would be one end of an output shaft of a torque converter. This shaft is always in motion when the wheels of the vehicle are in motion thus ensuring that the pump could always be driven upon engagement of the magnetic clutch 124. As stated earlier the emergency pump 18 will draw fluid from the reservoir and deliver it via conduit 126 to fluid conduit 86 of the steering system. One-way check valve 142 ensures that fluid will flow to the steering valve and will be metered to the appropriate steering cylinders.

Note that the supply of fluid from the emergency pump progresses to the slow steering system. This is necessary as the emergency fluid pump 18 is only large enough to supply a limited amount of fluid. By design it would be reasonable to expect that this pump supply enough fluid to enable the vehicle operator to drive himself out of immediate danger. The emergency steering system is not contemplated as a replacement of the primary and secondary pumps but it will enable the articulated vehicle to be controlled upon either a prime mover failure or pump failure.

Although the emergency fluid pump 18 is shown to be driven in one direction it may be desirable in certain situations to have an emergency fluid pump of the type that has the input shaft rotatable in either a clockwise or counterclockwise direction and still deliver fluid to the outlet of the pump under pressure. A pump of this type may be desirable in an embodiment of the invention in order to assure steering fluid delivery regardless of the direction of rotation of the vehicle wheels driving through the drive means to the torque converter output shaft and the emergency steering pump drive shaft.

The emergency steering system will automatically cease operation on an increase in fluid pressure in line 86 above the threshold setting of the pressure sensitive switch 136. For instance, if a stalled engine 10 is restarted by the vehicle operator the primary 12 and secondary 80 pumps will again pump fluid. This will cause (fluid pressure from pump 80) the disengagement of the electromagnetic clutch 124 thus isolating the emergency fluid pump 18 from the ground drive source 30.

FIG. 3, along with FIGS. 4 and 5 present another alternative ground drive to emergency pump clutch device. In FIG. 3 the layout and equipment presented is similar to the equipment of FIG. 1 only the electromagnetic clutch and the pressure sensitive electric switch is not used. Where appropriate, identification numbers in FIG. 3 are identical to those of FIG. 1 when the equipment is identical.

Alternatively provided in this embodiment is the use of a fluid motor or cylinder 142 which is shown schematically in FIGS. 4 and 5. This type of clutch means is represented in FIG. 3 by item 26. This clutch means receives a pressure signal from conduit 144 which communicates with the conduit 44 which leads from the primary fluid pump 12 to the selective valving means generally 16.

Looking at FIG. 4 the fluid cylinder 142 is shown in an attitude representing a disengaged state of the clutch means. Fluid has been provided to the cylinder by means of conduit 144 which has displaced piston 146 against spring 150 thus allowing pulley wheel 152 to approach output pulley wheels of the ground drive source (pulley wheel 154) and the emergency fluid pump (pulley wheel 156) such that there is slack in the pulley belt 160.

As shown in FIG. 5, upon failure of the primary steering system pump or the prime mover, fluid pressure in conduit 44 will decrease and consequently allow the evacuation of fluid from the cylinder 142 as the spring 150 will force the piston toward the port of the cylinder. As the piston moves it will carry its piston rod and the attached pulley wheel 152 away from the ground drive and pump drive pulley wheels. This will result in the tightening of pulley belt 160 and the driving of the emergency pump pulley wheel (and pump) by means of the ground drive pump.

Although the embodiment expressed by the FIGS. 3, 4, and 5 do show a working embodiment it is presented herein to communicate the principle or gist of the invention.

What has been accomplished in this invention is the use of steering system pressure to determine the need for the delivery of emergency steering fluid and to use the lack of system pressure during a pump failure to trigger the engagement of an emergency fluid delivery system.

Although the system described in this disclosure is primarily concerned with an emergency steering system, it is obvious that a ground drive system of this type could be well utilized in a hydraulic brake system, an implement hydraulic system or other hydraulic devices that work when the host vehicle is in motion.

Thus it is apparent that there has been provided in accordance with the invention an emergency steering system that fully satisfies the objects aims and advantages set forth above. While the invention has been described in conjunction with specific embodiments thereof it is evident that many alternatives, modifications and variations will be apparent to those skilled in the art in light of the foregoing description. Accordingly it is intended to embrace all such alternatives, modifications and variations as fall within the scope of the appended claims.

What is claimed is:

1. An emergency steering system for use with a hydraulic steering system of a vehicle including a primary driven pump, a reservoir source of fluid, a selective valving means including a steering valve and means to position said steering valve, a hydraulic steering cylinder and first conduit for delivering fluid from said reservoir source of fluid through said driven pump and said selective valving means to said hydraulic steering cylinder, said first conduit means hosting a one-way check valve allowing fluid to flow from said pump to said selective valving means, and further second conduit for delivering fluid from said steering cylinder through said selective valving means to said reservoir source of fluid, the improvement comprising:
   an emergency fluid pump having an input port and an output port for supplying fluid to said hydraulic steering system;
   a ground drive source having motion corresponding to the motion of said vehicles;
   a electromagnetic clutch means coupled to said emergency fluid pump and said ground drive source which when engaged allows said ground drive source to drive said emergency fluid pump and which when disengaged prevents said ground drive source from driving said emergency fluid pump;
   sensing means responsive to the presence of fluid pressure in said first conduit;
   third conduit means allowing fluid communication between said output port of said emergency fluid pump and said first conduit means of said hydraulic steering system;
   a one-way check valve allowing fluid to flow in only one direction in said third conduit;
   a fourth conduit means allowing fluid communication between said inlet port of said emergency fluid pump and said reservoir source of fluid.

2. The invention in accordance with claim 1 wherein said emergency fluid pump will deliver fluid from its output orifice regardless of the direction of input shaft motion.

3. The invention in accordance with claim 1 wherein the ground drive source is the transmission of the vehicle, the transmission always in motion when the vehicle is in motion.

4. An emergency steering system for use with a hydraulic steering system of a vehicle including a primary driven pump, a reservoir source of fluid, a selective valving means including a steering valve and means to position said steering valve, a hydraulic steering cylinder and first conduit for delivering fluid from said reservoir source of fluid through said driven pump and said selective valving means to said hydraulic steering cylinder, said first conduit means hosting a one-way check valve allowing fluid to flow from said pump to said selective valving means, and further second conduit for delivering fluid from said steering cylinder through said selective valving means to said reservoir source of fluid, the improvement comprising:
   an emergency fluid pump having an input port and an output port and a drive pulley wheel for driving the emergency fluid pump for supplying fluid to said hydraulic steering system;
   a ground drive source equipped with a pulley wheel in motion whenever said vehicle is in motion;
   a fluid operated clutch means comprising a hydraulic cylinder having an internal piston and a piston rod carrying a pulley wheel, spring loaded by means of a spring to minimize the volume of the piston, the fluid operated clutch means responsive to the presence of fluid pressure in said first conduit;
   a pulley belt simultaneously carried on the pulleys of the emergency fluid pump, the ground drive source and the fluid operated clutch means which is in a slack condition when the hydraulic cylinder of the fluid operated clutch means is pressurized by the presence of fluid pressure in said first conduit and is under tension when fluid pressure in said first conduit is insufficient to maintain the piston fluid operated clutch against the spring in the cylinder of the fluid operated clutch whereby the pulley belt being under tension will allow ground drive source to drive the emergency fluid pump;

third conduit means allowing fluid communication between said output port of said emergency fluid pump and said first conduit means of said hydraulic steering system;
a one-way check valve allowing fluid to flow in only one direction in said third conduit;
a fourth conduit means allowing fluid communication between said inlet port of said emergency fluid pump and said reservoir source of fluid.

* * * * *